United States Patent
Tobita et al.

(10) Patent No.: US 6,794,035 B2
(45) Date of Patent: Sep. 21, 2004

(54) GRAPHITIZED CARBON FIBER POWDER AND THERMALLY CONDUCTIVE COMPOSITION

(75) Inventors: Masayuki Tobita, Tokyo (JP); Naoyuki Shimoyama, Tokyo (JP); Shinya Tateda, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 0 days.

(21) Appl. No.: 10/255,275

(22) Filed: Sep. 26, 2002

(65) Prior Publication Data

US 2003/0064216 A1 Apr. 3, 2003

(30) Foreign Application Priority Data

Oct. 2, 2001 (JP) ........................................ 2001-306681

(51) Int. Cl.⁷ ................................................ B32B 5/16
(52) U.S. Cl. ...................... 428/402; 428/403; 428/407; 427/212; 427/228; 264/29.1
(58) Field of Search ................................ 428/402, 407, 428/403; 427/212, 228; 264/29.1

(56) References Cited

U.S. PATENT DOCUMENTS

| | | | |
|---|---|---|---|
| 5,340,670 A | * | 8/1994 | Takami et al. ............... 429/331 |
| 6,355,206 B1 | * | 3/2002 | Hanzawa et al. ............ 266/239 |
| 6,413,640 B1 | * | 7/2002 | Hanzawa et al. ............ 428/408 |
| 6,472,058 B2 | * | 10/2002 | Hanzawa et al. .......... 428/293.4 |
| 6,627,143 B2 | * | 9/2003 | Hanzawa et al. ............ 264/657 |

FOREIGN PATENT DOCUMENTS

| | | |
|---|---|---|
| JP | 62-131033 | 6/1987 |
| JP | 02-242919 | 9/1990 |
| JP | 03-164416 | 7/1991 |
| JP | 04-246456 | 9/1992 |
| JP | 05-017593 | 1/1993 |
| JP | 05-222620 | 8/1993 |
| JP | 05-247268 | 9/1993 |
| JP | 07-048181 | 2/1995 |
| JP | 07-148181 | 2/1995 |
| JP | 09-283955 | 10/1997 |
| JP | 10-298433 | 11/1998 |
| JP | 2000-103610 | 4/2000 |

* cited by examiner

Primary Examiner—Leszek B Kiliman
(74) Attorney, Agent, or Firm—Crompton, Seager & Tufte, LLC

(57) ABSTRACT

Graphitized carbon powder are produced by carbonizing and expanding a pitch by heating to form carbonaceous foam and by graphitizing before pulverizing or graphitizing after pulverizing the carbonaceous foam. The resultant graphitized carbon powders have an interplanar spacing (d002) of graphite planes of less than 0.3370 nm. The powders preferably have an average particle size of from 2 to 200 μm. A thermally conductive composition includes the graphitized carbon powders in a matrix. The content of the powders is preferably 1 to 800 parts by weight relative to 100 parts by weight of the matrix. Thus, the graphitized carbon powders that have excellent thermal conductivity and a thermally conductive composition including such powders are provided.

19 Claims, No Drawings

GRAPHITIZED CARBON FIBER POWDER AND THERMALLY CONDUCTIVE COMPOSITION

BACKGROUND OF THE INVENTION

This invention relates to graphitized carbon powder and that has excellent thermal conductivity and a thermally conductive composition containing the powder.

With recent advancements, miniaturization, and lightening of electronic hardware, semiconductor packages have become more compact and more highly integrated and operated at higher speed. Therefore, the heat generated by the electronic hardware is a very important issue. Generally, to dissipate the heat from heat-generating components to outside, a molded article such as a sheet material made of a thermally conductive polymer composition and a liquid composition such as polymer grease and adhesive are placed between a radiator and one of the followings: a printed circuit board; a semiconductor package; a housing; a radiation plate and a heat sink.

Such thermally conductive compositions include a matrix, such as resin and rubber, and a filler that has high thermal conductivity in the matrix. Possible fillers include metal oxide, metal nitride, metal carbide, and metal hydroxide. Examples of such possible fillers include aluminum oxide, boron nitride, silicon nitride, magnesium oxide, zinc oxide, silicon carbide, quartz, and aluminum hydroxide. However, such compositions do not necessarily have sufficient thermal conductivity.

In order to improve the thermal conductivity, various compositions have been proposed that include highly thermally conductive graphite powders or carbon fibers as filler in the matrix.

For example, Japanese Laid-Open Patent Publication No.62-131033 discloses a molded article made of thermally conductive resin in which the resin is filled with graphite powders. Japanese Laid-Open Patent Publication No.4-246456 discloses a composition of polyester resin containing carbon black or graphite. Japanese Laid-Open Patent Publication No.5-17593 discloses a thermally conductive molded article of great mechanical strength in which the carbon fibers are arranged in a certain direction and are impregnated with graphite powder and thermosetting resin. Japanese Laid-Open Patent Publication No.5-222620 discloses a thermally conductive material using pitch-based carbon fibers that have a specific cross section.

Japanese Laid-Open Patent Publication No.5-247268 discloses a rubber composition in which is mixed synthetic graphite having a particle size of 1 to 20 μm. Japanese Laid-Open Patent Publication No.9-283955 discloses a thermally conductive sheet in which the graphitized carbon fibers of specific aspect ratio are dispersed in polymer, such as silicone rubber. Japanese Laid-Open Patent Publication No.10-298433 discloses a composition and a radiation sheet in which silicone rubber has, mixed within it, spherical graphite powders having an interplanar spacing of crystals from 0.330 to 0.340 nm. Japanese Laid-Open Patent Publication No.2-242919 and Japanese Laid-Open Patent Publication No.7-48181 disclose certain pitch-based carbon fibers as highly thermally conductive carbon fibers.

However, for recent high performance electronic parts, due to increase in amount of heat generation, the need for greater thermal conductivity has increased. Therefore, the thermal conductivity is still insufficient for the above-mentioned compositions that include graphite powder or carbon fibers as thermally conductive filler.

The object of the present invention is to provide graphitized carbon powders that has excellent thermal conductivity and a thermally conductive composition including such graphitized carbon powders.

BRIEF SUMMARY OF THE INVENTION

A graphitized carbon powder is produced by carbonizing and expanding a pitch by heating the pitch to form carbonaceous foam and by graphitizing and pulverizing the carbonaceous foam.

A thermally conductive composition includes matrix and such graphitized carbon powders in the matrix.

A method of making a graphitized carbon powder includes carbonizing and expanding a pitch by heating the pitch to form a carbonaceous foam; and graphitizing and pulverizing the carbonaceous foam.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

Embodiments of the present invention are described in detail below.

1. Graphitized Carbon Powders

Graphitized carbon powders may be produced by carbonizing and expanding a pitch by heating to form a carbonaceous foam, graphitizing the carbonaceous foam, and then pulverizing the graphitized foam. Alternatively, graphitized carbon powders may be produced by carbonizing and expanding a pitch by heating to form a carbonaceous foam, pulverizing the carbonaceous foam, and then graphitizing the pulverized powders.

The present invention uses a special phenomenon of expansion or foaming. This phenomenon enables graphitized carbon powders to have a highly developed graphite structure and excellent thermal conductivity. Accordingly, a thermally conductive composition including such graphitized carbon powders as a filler also has excellent thermal conductivity.

When a pitch is carbonized and expanded by heated, voids are generated and the pitch is expanded along the perimeter of voids (i.e., the wall that defines each void in the expanded pitch). Thus, a carbonaceous foam is generated that has an expanded or foamed structure in which carbon layers are highly neatly arranged relative to the wall. When the carbonaceous foam is graphitized and pulverized, graphitized carbon powders can be obtained that have a highly developed graphite structure and excellent thermal conductivity.

Japanese Laid-Open Patent Publication No.3-164416 and Japanese Laid-Open Patent Publication No.2000-103610 disclose carbon powders that are formed by pulverizing a certain type of the carbon foam. These publications use the foaming phenomenon to generate the carbon powders. However, they are essentially conceptually different from the present invention in that the foaming is intended for improvement in anti-corrosive properties or chemical resistance or improvement in capacity or strength of an electrode. In addition, since these carbon powders are not graphitized, these powders cannot achieve the objective of the present invention, i.e. improved thermal conductivity.

A pitch as a raw material is obtained by heating tar which is generated by distilling organic materials such as stone coal, coal oil, or wood or by polymerizing polycyclic aromatic compounds such as naphthalene and anthracene.

Typical types of such pitch include coal oil-pitch, stone coal-pitch, coal tar-pitch, coke-pitch, and synthetic pitch. Among them, coal oil-pitch and stone coal-pitch are preferred. Especially, isotropic pitch or mesophase pitch is preferred.

The graphitized carbon powders of the present invention are produced by the either method (a) or (b):

(a) a method including a process of carbonizing and expanding a pitch by heating to form a carbonaceous foam, a process of graphitizing the carbonaceous foam by heating to form a graphitized foam, and a process of pulverizing the graphitized foam to form graphitized carbon powders, or (b) a method including a process of carbonizing and expanding a pitch by heating to form a carbonaceous foam, a process of pulverizing the carbonaceous foam to form carbonaceous powders, and a process of graphitizing the carbonaceous powders to form graphitized carbon powders.

Each process is explained below.

In the carbonizing and expanding process, a method for expanding a pitch is not particularly limited and a conventional expanding method can be applied. Exemplary expanding methods include (1) an expanding method by melting a pitch by heating the pitch in a pressurized state and reducing the pressure acting on the melted pitch from higher pressure to lower one and (2) an expanding method by adding a foaming agent or a volatile substance to a pitch.

In the former method, the higher pressure may be a pressure of any size if it is higher than lower pressure. For example, the higher pressure ranges from 2 MPa to 20 MPa. The size of the lower pressure is not particularly limited either and, for example, ranges from 50 kPa to 200 kPa. To facilitate the transition from the higher pressure to the lower one, the lower pressure is preferably atmospheric pressure (about 100 kPa).

In the latter method, any material may be used suitably as the foaming agent or the volatile substance in the latter method if it becomes gaseous in the carbonizing and expanding process. Although the type of the foaming agent and the volatile substance is not particularly limited, in terms of handling properties and foaming efficiency, an organic volatile foaming agent is preferred which has a boiling point of from 5 to 60 degree C. Exemplary organic volatile foaming agents include trichloromonofluoromethane, dichrolomonofluoromethane, methylene chloride, trichlorotrifluoroethane, and acetone.

The required heating temperature in the carbonizing and expanding process is 250 to 1500 degree C., more preferably 500 to 900 degree C. When the temperature is greater than 1500 degree C., the resultant carbonaceous foam becomes too hard to be pulverized later. When the temperature is less than 250 degree C., the degree of the carbonization becomes insufficient and graphitized carbon powders having high thermal conductivity cannot be obtained. The heating in the carbonizing and expanding process is preferably conducted in a non-oxidative atmosphere where the pitch is not substantially oxidized, such as in a vacuum atmosphere, in an inert gas such as argon gas and nitrogen gas, and in a reductive atmosphere. If the pitch is not heated in a non-oxidative atmosphere, a resultant form may be undesirably degenerated by oxidation.

The required heating temperature in the graphitizing process is at least 2500 degree C. As the temperature in the graphitizing process becomes higher, the degree of graphitization of the resultant powders becomes greater. Thus, graphitized carbon powders that have higher thermal conductivity can be generated. When the temperature is lower than 2500 degree C., graphitization becomes insufficient and carbon powders that have high thermal conductivity cannot be generated. The heating in the graphitizing process, as well as the heating in the carbonizing and expanding process, is preferably conducted in an non-oxidative atmosphere. If the carbonaceous foam or carbonaceous powders are not heated in a non-oxidative atmosphere, the foam or the powders may be undesirably degenerated by oxidation.

In practice, the heating is preferably conducted for a given time at a high temperature from 2800 to 3200 degree C. in argon gas. This actively promotes graphitization to produce highly thermally conductive graphitized carbon powders in which graphite structure highly develops.

The increasing rate, the decreasing rate, and heating time of the heating in the carbonizing and expanding process and the graphitizing process are not particularly limited.

In pulverizing process, pulverizing machines such as ball mill, Victory mill, a jet mill, and a high-speed rotation mill are used as appropriate.

The average particle size of graphitized carbon powders is not particularly limited but is preferably 2–200 $\mu$m. When the average particle size is smaller than 2 $\mu$m, the contact of the fiber powders in the matrix is reduced and a heat transfer becomes insufficient. This reduces the thermal conductivity of the resultant thermally conductive composition. When the average particle size is larger than 200 $\mu$m, the fiber powders are too bulky to be mixed in the matrix at a high concentration. The average particle size can be calculated from the particle size distribution by laser diffractometry model.

From X-ray diffractometry, it is preferred that the graphitized carbon powders have an interplanar spacing (d002) of graphite planes of less than 0.3370 nm. When the interplanar spacing (d002) is less than 0.3370 nm, it means that carbon fiber powders and a thermally conductive composition achieve higher thermal conductivity. When the interplanar spacing (d002) is 0.3370 nm or greater, the thermal conductivity is inadequate. Accordingly, a composition that including such carbon fiber powders as thermally conductive filler cannot achieve high thermal conductivity.

In the X-ray diffractometry, a diffractometry pattern of the carbon fibers is measured by using CuK alpha as a X-ray source and highly purified silicon as a standard material. The interplanar spacing (d002) is calculated from the peak position and half-value width of the (002) diffractometry pattern. This calculation is based on a method pursuant to Japan Society for the Promotion of Science. The lower limit of the interplanar spacing (d002) is a theoretical value of 0.3354 nm.

The wall of the graphitized foam, which is generated as an intermediate material in a method (a), has thermal conductivity of preferably at least 400 W/(m·K), more preferably at least 800 W/(m·K), even more preferably at least 1000 W/(m·K).

2. Thermally Conductive Composition

A thermally conductive composition includes the above-mentioned graphitized carbon powders in a matrix as thermally conductive filler.

The matrix is preferably selected from known such as polymeric material and inorganic matrix such as metal, ceramics, and carbon, according to required characteristics or applications. If the molding capability is taken into consideration, the matrix is preferably a polymeric material.

The polymeric material is not particularly limited and is preferably selected from thermoplastic resin, thermoplastic elastomer, thermosetting resin, and vulcanized rubber according to required characteristics or applications. For example, preferred thermally conductive adhesives include adhesive polymeric materials such as epoxy resin, polyimide, and acrylic resin. Preferred molding materials include thermoplastic resin, thermoplastic elastomer, thermosetting resin, and vulcanized rubber.

The thermoplastic resin includes polyethylene, polypropylene, ethylene-α-olefin copolymer such as ethylene-propylene copolymer, polymethylpentene, polyvinyl chloride, polyvinylidene chloride, polyvinyl acetate, ethylene vinyl acetate copolymer, polyvinyl alcohol, polyacetal, fluororesins such as polyvinylidene fluoride and polytetrafluoroethylene, polyethylene terephthalate, polybutylene terephthalate, polyethylene naphthalate, polystyrene, polyacrylonitrile, styrene acrylonitrile copolymer, ABS resin, polyphenylene ether (PPE) resin and modified PPE resin, aliphatic and aromatic polyamides, polyimide, polyamide imide, polymethacrylic acid and polymethacrylates such as polymethyl methacrylate, polyacrylic acids, polycarbonate, polyphenylene sulfide, polysulfone, polyether sulfone, polyether nitrile, polyether ketone, polyketone, liquid crystal polymer, silicone resin, and ionomer.

The thermoplastic elastomer includes repeatedly moldable and recyclable thermoplastic elastomers such as styrene-butadiene or styrene-isoprene block copolymers and hydrogenated polymer thereof, styrenic thermoplastic elastomer, olefinic thermoplastic elastomer, vinyl chloride thermoplastic elastomer, polyester thermoplastic elastomer, polyurethane thermoplastic elastomer, and polyamide thermoplastic elastomer. The thermoplastic elastomer is advantageous in that it is repeatedly moldable and recyclable.

The thermosetting resin includes epoxy resin, polyimide, bis-maleimide resin, benzocyclobutene, phenol resin, unsaturated polyester, diallyl phthalate, silicone resin, polyurethane, polyimide silicone, thermosetting polyphenylene ether resin and modified PPE resin.

The vulcanized rubber and analogues thereof include natural rubber, butadiene rubber, isoprene rubber, styrene-butadiene copolymer rubber, nitrile rubber, hydrogenated nitrile rubber, chloroprene rubber, ethylene-propylene rubber, chlorinated polyethylene, chlorosulfonated polyethylene, butyl rubber and halide butyl rubber, fluorine rubber, urethane rubber, and silicone rubber.

In terms of temperature characteristics, such as thermal resistance and electric reliability, the polymeric material is preferably at least one material selected from the group consisting of silicone rubber, epoxy resin, polyurethane, unsaturated polyester, polyimide, bis-maleimide, benzocyclobutene, fluororesin, polyphenylene ether resin and thermoplastic elastomer. More preferably, the polymeric material is at least one material selected from the group consisting of silicone rubber, epoxy resin, unsaturated polyester resin, polyimide, polyurethane and thermoplastic elastomer.

In an application for a wiring board where permittivity and dielectric loss tangent are small and high-frequency characteristic is required, fluororesin, thermosetting polyphenylene ether resin, modified PPE resin, and polyolefin resin are desired.

One or more of the above polymeric materials can be used as appropriate. Further, a polymer alloy formed of a plurality of these polymeric materials may be used. The methods of hardening or cross-linking thermosetting resin or vulcanized rubber are not particularly limited but include known hardening or cross-linking methods such as thermosetting, light setting, moisture setting, exposure to radiation, and electron irradiation.

The content of the graphitized carbon powders is determined depending on its intended applications or required characteristics of the end products. However, the content of the powders is preferably 1 to 800 parts by weight, more preferably 5 to 500 parts by weight, and most preferably 20 to 300 parts by weight relative to 100 parts by weight of the matrix. The greater the content of the powders is, the higher the thermal conductivity of the composition becomes. When the content is more than 800 parts by weight, the viscosity of the composition is increased and fluidity is lost, which makes it difficult to disperse the carbon fiber powders in the matrix uniformly. Also, gas bubbles are inevitably included in the matrix. When the content is less than 1 part by weight, the thermal conductivity of the composition is lowered.

To mix the above-mentioned graphitized carbon powders with the matrix to prepare the composition, known mixing machines may be used, such as a blender, a mixer, a roller, or an extruder. In mixing, deaeration by depressurization or pressurization is preferably conducted as required. To decrease the viscosity of the composition, it is advantageous to add to the composition a volatile organic solvent, low-viscosity softener, or a reactive plasticizer.

The thermally conductive composition may be processed by, for example, compression molding, extrusion molding, injection molding, casting molding, transfer molding, blow molding, blade molding, and calendering molding. When the composition is liquid, it may be processed by painting, printing, dispensing, and potting other than the above methods. For example, a thermally conductive molded article that has excellent thermally conductive property may be produced by processing the composition into a predetermined shape by the above methods. A thermally conductive sheet that has excellent thermally conductive property may be produced by processing the composition into a sheet. In particular, a flexible sheet may be obtained by using vulcanized rubber or thermoplastic elastomer which has low hardness as a matrix.

Thus, the thermally conductive composition may be used as a material for liquid articles such as thermally conductive grease and thermally conductive adhesive and as a material for molded article such as a thermally conductive sheet and a member of a semiconductor package, for all of which a high heat radiation property is required. The conductive composition may be used to form thermally conductive grease and thermally conductive adhesive placed between the heating element and the heat transfer member or to form heat radiation members, such as a radiator, a cooler, a heat sink, a heat spreader, a die pad, a printed circuit board, a cooling fan, a heat pipe, and a housing. Thus, a heat-dissipating measure is possible.

The advantages of the above embodiments are described below.

The graphitized carbon powders are obtained by carbonizing and expanding the pitch by heating the pitch to form carbonaceous foam and graphitizing and pulverizing the carbonaceous foam. Thus, the highly thermally conductive graphitized carbon powders are obtained in which graphite structure highly develops. Also, by mixing the powders in the matrix, a highly thermally conductive composition can be obtained.

A mesophase pitch has both ordered molecular orientation over a long distance and molecular mobility. Thus, a mesophase pitch is a carbonaceous material that is easily graphitized. By using a mesophase pitch as a raw material pitch, carbon layers are highly neatly arranged during the process of forming a carbonaceous foam and highly graphitized upon heating. Thus, highly thermally conductive graphitized carbon powders can be obtained.

The use of the graphitized carbon powders that have an interplanar spacing (d002) of graphite planes of less than 0.3370 nm by X-ray diffractometry makes it possible to achieve high thermal conductivity.

When the carbonaceous foam is pulverized before graphitized, exposure of new graphite planes after the pulverization facilitates condensation polymerization reaction and cyclization reaction during subsequent graphitization. Thus, highly thermally conductive graphitized carbon powders are produced.

The average particle size of graphitized carbon powders is 2 to 200 μm. This makes it possible to fill the graphitized carbon powders in the matrix at high density. Thus, the thermal conductivity of the composition is improved. Besides, such composition can be easily produced industrially.

As a matrix, the polymeric material of at least one selected from thermoplastic resin, thermoplastic elastomer, thermosetting resin, and vulcanized rubber is used. Thus, the thermally conductive composition which has good molding capability and excellent thermal conductivity and thus can be applicable to various applications can be obtained.

1 to 800 parts by weight of the graphitized carbon powders are mixed with 100 parts by weight of the matrix. This facilitates the uniform dispersion of the carbon fiber powders in the matrix, yielding a thermally conductive composition of low viscosity and good molding capability. The manufacture of the composition is also facilitated.

EXAMPLES

The above-mentioned embodiments are further described with reference to Samples, Examples and Comparative examples, which are not intended to limit the scope of the present invention in any way.

Sample 1, Graphitized Carbon Powders

A mesophase pitch was filled in an aluminum die, depressurized with a vacuum pump to below 100 Pa, and heated at 300 degree C., which is the temperature higher than the softening point of the mesophase pitch. Then, nitrogen was introduced to shift the system from a depressurized state to a pressurized state of 7 MPa of nitrogen atmosphere. The pitch was heated up to 1500 degree C. at an increase rate of 4 degree C./minute and maintained at 1500 degree C. for 20 minutes. Upon cooling, the pressure of the system was gradually reduced to atmospheric pressure and the pitch was expanded to form a carbonaceous foam. The resultant carbonaceous foam was further heated at 3000 degree C. in an argon gas to generate a graphitized foam. The wall of the graphitized foam has thermal conductivity of 1000 W/(m·K). The graphitized foam was pulverized with a ball mill to form graphitized carbon powders (Sample 1).

The graphitized carbon powders of Sample 1 have an average particle size of 60 μm and an interplanar spacing (d002) of graphite planes of 0.3362 nm by X-ray diffractometry.

Sample 2, Graphitized Carbon Powders

A mesophase pitch was filled in an aluminum die, depressurized with a vacuum pump to below 100 Pa, and heated at 300 degree C., which is the temperature higher than the softening point of the mesophase pitch. Then, nitrogen was introduced to shift the system from a depressurized state to a pressurized state of 7 MPa of nitrogen atmosphere. The pitch was heated up to 1500 degree C. at an increase rate of 4 degree C./minute and maintained at 1500 degree C. for 20 minutes. Upon cooling, the pressure of the system was gradually reduced to atmospheric pressure and the pitch was expanded to form a carbonaceous foam. The resultant carbonaceous foam was pulverized with a ball mill to form carbonaceous powders. The resultant carbonaceous powders were further heated at 3000 degree C. in an argon gas to generate graphitized carbon powders (Sample 2).

The graphitized carbon powders of Sample 2 have an average particle size of 45 μm and an interplanar spacing (d002) of graphite planes of 0.3360 nm by X-ray diffractometry.

Sample 3, Graphitized Carbon Powders 100 parts by weight mesophase pitch and 10 parts by weight Freon™ -113(1,1,2-trifluor-1,2,2-trichlorethane) were mixed together. The mixture was filled in an aluminum die and expanded by heating at 80 degree C. Then the resultant foam was heated up to 1500 degree C. at an increase rate of 4 degree C./minute and maintained at 1500 degree C. for 20 minutes to generate a carbonaceous foam. The carbonaceous foam was further heated at 3000 degree C. in an argon gas to generate a graphitized foam. The wall of the graphitized foam has thermal conductivity of 800 W/(m·K). Then the graphitized foam was pulverized with a ball mill to form graphitized carbon powders (Sample 3).

The graphitized carbon powders of Sample 3 have an average particle size of 60 μm and an interplanar spacing (d002) of graphite planes of 0.3365 nm by X-ray diffractometry.

Sample 4, Carbonaceous Powders

A mesophase pitch was filled in an aluminum die, depressurized with a vacuum pump to below 133 Pa, and heated at 300 degree C., which is the temperature higher than the softening point of the mesophase pitch. Then, nitrogen was introduced to shift the system from a depressurized state to a pressurized state of 7 MPa of nitrogen atmosphere. The pitch was heated up to 1500 degree C. at an increase rate of 4 degree C./minute and maintained at 1500 degree C. for 20 minutes. Upon cooling, the pressure of the system was gradually reduced to atmospheric pressure and the pitch was expanded to form a carbonaceous foam. The wall of the carbonaceous foam has thermal conductivity of 80 W/(m·K). The resultant carbonaceous foam was pulverized with a ball mill to form carbonaceous powders (Sample 4).

The carbonaceous powders of Sample 4 have an average particle size of 60 μm. Since the carbonaceous powders (Sample 4) were not graphitized, an interplanar spacing (d002) of graphite planes by X-ray diffractometry cannot be measured.

Thermally conductive compositions of Examples 1 to 6 are examples in which the graphitized carbon powders of Samples 1 to 3 are mixed in the matrix, respectively. Examples 1 to 3 are examples of the manufacturing process of a flexible thermally conductive sheet made of silicone rubber. Example 4 is an example of the manufacturing process of an easily recyclable thermally conductive sheet made of thermoplastic elastomer. Example 5 is an example of the manufacturing process of injection-moldable thermally conductive molded article. Example 6 is an example of the manufacturing process of an epoxy adhesive using epoxy adhesive polymer.

Thermally conductive compositions of Comparative examples 1 to 4 are examples in which the carbonaceous powders of Sample 4 are used.

Example 1

80 parts by weight of the graphitized carbon powders of Sample 1 as a thermally conductive filler, 220 parts by weight of aluminum oxide powder (SHOWA DENKO K.K.), and 80 parts by weight of aluminum hydroxide powder (SHOWA DENKO K.K.) were added to and dispersed in 100 parts by weight of an addition-type liquid silicone rubber (Dow Corning Toray Silicone Co., Ltd.) as a matrix to prepare a thermally conductive composition. The resultant composition was hot-pressed and molded to form a thermally conductive sheet of a thickness of 2 mm. The resultant sheet had an Asker C hardness of 17. The thermal conductivity in the thickness direction of the sheet was 3.2 W/(m·K).

Example 2

A thermally conductive composition was prepared as in Example 1, except that the graphitized carbon powders of Sample 2 were used as thermally conductive filler. The resultant composition was hot-pressed and molded to form a thermally conductive sheet of a thickness of 2 mm. The resultant sheet had an Asker C hardness of 15. The thermal conductivity in the thickness direction of the sheet was 3.1 W/(m·K).

Example 3

A thermally conductive composition was prepared as in Example 1, except that the graphitized carbon powders of Sample 3 were used as thermally conductive filler. The resultant composition was hot-pressed and molded to form a thermally conductive sheet of a thickness of 2 mm. The resultant sheet had an Asker C hardness of 15. The thermal conductivity in the thickness direction of the sheet was 2.8 W/(m·K).

Comparative Example 1

A thermally conductive composition was prepared as in Example 1, except that the powders of Sample 4 were used as thermally conductive filler. The resultant composition was hot-pressed and molded to form a thermally conductive sheet of a thickness of 2 mm. The resultant sheet had an Asker C hardness of 15. The thermal conductivity in the thickness direction of the sheet was 1.2 W/(m·K).

Example 4

60 parts by weight of the graphitized carbon powders of Sample 1 as a thermally conductive filler, 30 parts by weight of boron nitride powder (DENKI KAGAKU KOGYO KK.), and 20 parts by weight of aluminum hydroxide powder (SHOWA DENKO K.K.) were added to an dispersed in 100 parts by weight of low-hardness styrenic thermoplastic elastomer (RIKEN VINYL INDUSTRY CO., LTD.) as a matrix. The mixture was mixed with a two-axis extruder to prepare a pellet-like thermally conductive composition. The resultant composition was extrusion-molded to form a thermally conductive sheet of a thickness of 3 mm. The resultant sheet had a Shore A hardness of 73. The thermal conductivity in the thickness direction of the sheet was 2.8 W/(m·K).

Comparative Example 2

A pellet-like thermally conductive composition was prepared as in Example 4, except that the carbonaceous powders of Sample 4 were used as thermally conductive filler. The resultant composition was extrusion-molded to form a thermally conductive sheet of a thickness of 3 mm. The resultant sheet had a Shore A hardness of 68. The thermal conductivity in the thickness direction of the sheet was 0.8 W/(m·K).

Example 5

80 parts by weight of the graphitized carbon powders of Sample 2 with their surfaces treated with a silane coupling agent as a thermally conductive filler, and 50 parts by weight of aluminum oxide powder (SHOWA DENKO K.K.) were added to and dispersed in 100 parts by weight of polyacetal resin (Asahi Kasei Corporation) as a matrix. The mixture was mixed with a two-axis extruder to prepare a pellet-like thermally conductive composition. The resultant composition was injection-molded to form a thermally conductive molded article of a thickness of 3 mm. The thermal conductivity in the thickness direction of the resultant molded article was 2.5 W/(m·K).

Comparative Example 3

A pellet-like thermally conductive composition was prepared as in Example 5, except that the carbonaceous powders of Sample 4 were used as thermally conductive filler. The resultant composition was injection-molded to form a thermally conductive molded article of a thickness of 3 mm. The thermal conductivity of the resultant molded article was 1.2 W/(m·K).

Example 6

130 parts by weight of the graphitized carbon powders of Sample 3 as a thermally conductive filler and 30 parts by weight of aluminum oxide powder (SHOWA DENKO K.K.) were added to and dispersed in 100 parts by weight of bis-phenol F-type epoxy resin (YUKA SHELL EPOXY CO.,LTD) containing adhesive amine-type hardener as a matrix to prepare a thermally conductive composition which is a epoxy-type adhesive composition. The resultant composition was thermally hardened to form a plate specimen of thickness of 1 mm. The thermal conductivity of the resultant plate specimen was 3.1 W/(m·K).

Comparative Example 4

A thermally conductive composition, epoxy-type adhesive composition, was prepared as in Example 6, except that the carbonaceous powders of Sample 4 were used as thermally conductive filler. The resultant composition was thermally hardened to form a plate specimen of thickness of 1 mm. The thermal conductivity of the resultant plate specimen was 1.3 W/(m·K).

Discussion

All the compositions of Examples 1 to 6 had high thermal conductivity. On the other hand, the compositions of Comparative examples 1 to 4 had lower thermal conductivity than the compositions of Examples 1 to 6 because the carbonaceous powders of Sample 4 were not graphitized.

It should be apparent to those skilled in the art that the present invention may be embodied in many other specific forms without departing from the spirit or scope of the invention. Particularly, it should be understood that the invention may be embodied in the following forms.

For the purpose of improvement of the surface of the graphitized carbon powders, the surface of the powders may be previously oxidized by electrolytic oxidation or treated with a known coupling agent or a known sizing agent. This improves wettability or filling capability of the powders to the matrix or the peel strength from the matrix at the interface.

The surface of the powders may also be coated with metal or ceramics by various methods such as electroless plating; electroplating; physical vapor evaporation such as vacuum evaporation, sputtering and ion plating; chemical vapor deposition; spraying; coating; immersion; sol-gel method; and mechanochemical method in which fine particles are mechanically fixed on the surface of the fibers.

Other than the graphitized carbon powders of the present invention, the composition may also include an incombustible agent, a softening agent, a colorant, or a stabilizer as required.

The composition may also include other thermally conductive fillers such as: metal and ceramic such as silver, copper, gold, aluminum oxide, magnesium oxide, boron nitride, aluminum nitride, silicon nitride, silicon carbide, and aluminum hydroxide; metal-coated resin; conventional graphitized carbon fiber; non-graphitized carbon fiber; natural graphite; synthetic graphite; meso-carbon micro-bead; and carbon in the form of a whisker, a microcoil, or a nanotube.

The composition may also include electrical insulative thermally conductive filler selected from the group consisting of aluminum oxide, magnesium oxide, boron nitride, aluminum nitride, silicon nitride, silicon carbide and aluminum hydroxide. In this case, electric non-conductance is provided to the end product.

Therefore, the present examples and embodiments are to be considered as illustrative and not restrictive and the invention is not to be limited to the details given herein, but may be modified within the scope and equivalence of the appended claims.

What is claimed is:

1. A graphitized carbon powder produced by carbonizing and expanding a pitch by healing the pitch to form carbonaceous foam and by graphitizing and pulverizing the carbonaceous foam, wherein the graphitized carbon powder has a thermal conductivity of at least 400 W/(m·K).

2. The graphitized carbon powder according to claim 1, wherein the graphitization is conducted before the pulverization.

3. The graphitized carbon powder according to claim 1, wherein the graphitization is conducted after the pulverization.

4. The graphitized carbon powder according to claim 1, wherein the powder has an interplanar spacing (d002) of graphite planes of less than 0.3370 nm.

5. The graphitized carbon powder according to claim 1, wherein the powder has an average particle size of from 2 to 200 µm.

6. The graphitized carbon powder according to claim 1, wherein the pitch is a mesophase pitch.

7. A thermally conductive composition comprising:
matrix; and
graphitized carbon powders mixed in the matrix, wherein the graphitized carbon powders are produced by carbonizing and expanding a pitch by heating the pitch to form carbonaceous foam and by graphitizing and pulverizing the carbonaceous foam, and
wherein the graphitized carbon powder has a thermal conductivity of at least 400 W/(m·K).

8. The composition according to claim 7, wherein the graphitization is conducted before the pulverization.

9. The composition according to claim 7, wherein the graphitization is conducted after the pulverization.

10. The composition according to claim 7, wherein the matrix is at least one selected from the group consisting of thermoplastic resin, thermoplastic elastomer, thermosetting resin, and vulcanized rubber.

11. The composition according to claim 7, wherein 1 to 800 parts by weight of the graphitized carbon powders is mixed relative to 100 parts by weight of the matrix.

12. A method of making a graphitized carbon powder, the graphitized carbon powder having a thermal conductivity of at least 400 W/(m·K) comprising:
carbonizing and expanding a pitch by heating the pitch to form a carbonaceous foam; and
graphitizing and pulverizing the carbonaceous foam.

13. The method according to claim 12, wherein the graphitization is conducted before the pulverization.

14. The method according to claim 12, wherein the graphitization is conducted after the pulverization.

15. The method according to claim 12, wherein the carbonizing and expanding step includes melting the pitch by heating the pitch under pressure to carbonize said pitch and reducing the pressure to expand said carbonized pitch.

16. The method according to claim 12, wherein the carbonizing and expanding step includes carbonizing and expanding by adding at least one of the group consisting of a foaming agent and a volatile substance.

17. The method according to claim 12, wherein the graphitization is conducted at least 2500 degree C.

18. The graphitized powder according to claim 2, wherein the carbonaceous foam has a thermal conductivity of at least 400 W/(m·K).

19. The composition according to claim 8, wherein the carbonaceous foam has a thermal conductivity of at least 400 W/(m·K).

* * * * *

UNITED STATES PATENT AND TRADEMARK OFFICE
CERTIFICATE OF CORRECTION

PATENT NO.    : 6,794,035 B2
DATED         : September 21, 2004
INVENTOR(S)   : Masayuki Tobita et al.

It is certified that error appears in the above-identified patent and that said Letters Patent is hereby corrected as shown below:

Column 11,
Line 27, delete "healing" and insert therefor -- heating --.

Signed and Sealed this

Fifth Day of April, 2005

JON W. DUDAS
*Director of the United States Patent and Trademark Office*